United States Patent [19]

Theisen et al.

[11] 4,361,622

[45] Nov. 30, 1982

[54] SILICATE COATING FOR HEAT-RESISTANT OBJECTS, SAID COATING HAVING A HEAT TRANSFER FUNCTION; OBJECTS HAVING SAID COATING; AND PROCESS FOR PRODUCING SUCH A COATING

[75] Inventors: Günter Theisen, Riedlingen; Alfred Eppich; Rudolf H. Hochleitner, both of Zirndorf, all of Fed. Rep. of Germany

[73] Assignee: Leipold & Eppich KG, Zirndorf via Nurnberg, Fed. Rep. of Germany

[21] Appl. No.: 203,906

[22] Filed: Nov. 4, 1980

[30] Foreign Application Priority Data

Nov. 9, 1979 [DE] Fed. Rep. of Germany ....... 2945288

[51] Int. Cl.³ .......................... B32B 5/16; B32B 19/00
[52] U.S. Cl. .................................... 428/363; 428/404; 428/428; 428/454; 428/920
[58] Field of Search ................ 427/193, 204; 428/363, 428/404, 428, 454, 920

[56] References Cited

U.S. PATENT DOCUMENTS 3,553,001 1/1971 Kohlschutter et al. ........ 428/363 X
3,827,892 8/1974 McCauley ...................... 428/363 X
4,039,713 8/1977 Vassiliou ......................... 428/454 X

FOREIGN PATENT DOCUMENTS 1001438 8/1965 United Kingdom ................ 428/363

*Primary Examiner*—Shrive P. Beck
*Attorney, Agent, or Firm*—Holman & Stern

[57] ABSTRACT

A silicate coating for heat-resistant objects, particularly containers having a heat transfer function, e.g. cooking pots or baking pans, is disclosed. The coating solves the problem of improving the heat transfer and heat distribution while at the same time improving the appearance. Toward these ends, it is proposed that the coating contain at least 10 wt. % of a mica, and be fired or baked on the object at a temperature below the decomposition, melting or dissolving temperature of the mica.

10 Claims, No Drawings

SILICATE COATING FOR HEAT-RESISTANT OBJECTS, SAID COATING HAVING A HEAT TRANSFER FUNCTION; OBJECTS HAVING SAID COATING; AND PROCESS FOR PRODUCING SUCH A COATING

BACKGROUND OF THE INVENTION

The invention generally relates to coatings, and more particularly to a silicate coating for heat-resistant objects, particularly containers, the coating providing a heat transfer function.

Coatings of this type in the prior art principally take the form of glazes and enamels for application to objects made of ceramic or metal. Such objects may include utensils and ware for cooking, roasting, grilling, baking, and serving; hot plates; stoves for cooking, roasting, grilling and baking; heating and radiator elements; and technical containers, e.g. sterilization apparatus and reaction vessels for the chemical and pharmaceutical industries. The glazes and enamels are applied to protect these objects against mechanical or chemical damage.

However, it has been found that these prior art coatings greatly reduce any desirable high heat transfer properties, principally because of their strong thermal insulating properties. Accordingly, there has been substantial effort to alleviate this drawback.

One solution found in the prior art involves providing the outer bottom or floor supporting surfaces of the fine steel kitchenware with an additional layer of a highly heat-conductive metal such as copper or aluminum. This extra layer is protected by an outer layer of fine steel to resist mechanical and chemical action. These known kitchenware items do indeed have improved heat transfer and more uniform heat distribution compared to ordinary items provided with a silicate coating, but this improvement is brought about at the cost of additional drawbacks. In the first place, there is increased material cost (electrolytic copper and the additional fine-steel plate), equipment cost (inductive brazing or soldering equipment), and labor cost (brazing, and removal of the resulting scale and projections), and thus appreciably increased overall cost. Secondly, the resulting layered vessel is heavier and less durable. And, thirdly, defective brazes almost certainly occur in manufacture and often lead to separation of the bottom layers.

A second prior art solution is exemplified by German Pat. No. 1,298,246 which discloses an enameled cooking vessel with a outer bottom or floor supporting surface covered with closed copper or aluminum foil, metal particles joined by a binder, or metal oxides. While with this technique there are improved heat transfer and heat distribution properties, there are also some disadvantages. For example, by firing the foil coating at 800° C. causes heavy scaling of the copper surface or melting of the aluminum. Consequently, when copper foil is used, one must resurface it, since its durability is greatly decreased by gas inclusions arising during the firing. And when aluminum foil is used, its integrity is destroyed in melting, and aluminum particles diffuse into the enamel, to some extent even as far as the metal of the vessel. Thus, pores result, into which acid combustion products penetrate, as for example when commercial gas is used as the heat source, and lead to premature corrosion of the vessel bottom. Also, aggressive media in the equipment used to wash the vessel have this kind of corrosive effect.

Finally, German Pat. No. 1,454,210 teaches the introduction of aluminum powder into the enamel of vessels in the region of the or outer bottom or floor supporting surface. This technique also promotes heat transmission and heat distribution in the vessel bottom, but the disadvantages mentioned supra in connection with German Pat. No. 1,298,246 with the use of aluminum foil are basically reproduced here with these Al powder-enamel prior art vessels. Further, since explosive hydrogen is liberated due to the alkalinity of the enamel slip, there are a number of hazards associated with the manufacture of these latter vessels. Finally, the aluminum-containing coatings have rough surfaces which are unattractive and not easy to maintain.

OBJECTS OF THE INVENTION

The principal object of the invention is to provide a silicate coating which avoids the aforementioned drawbacks.

Another object of the invention is to provide a silicate coating which enables a substantial improvement in heat transfer and heat distribution in cookware and other devices of the type described above.

Still another object of the invention is to provide a coating which gives said objects a pleasing appearance without any of the disadvantages mentioned above in connection with the state of the art.

DETAILED DESCRIPTION OF THE INVENTION

These and other objects are made possible according to the invention by providing a silicate coating with at least 10 wt.% of a mica and baking or firing the coating onto the surface of an object at a temperature below the decomposition, melting, or dissolving temperature of the mica.

Since mica has good heat transmission coefficient, mica particles pervade the inherently insulating coating in a finely distributed fashion, and paths are produced for the transport of the heat which is to be passed along. Due to the statistical distribution of the mica particles, in a container wall these paths arise both transversely to the wall (for heat transmission) and along it (for heat distribution), whereby heat flow occurs in both directions. In addition, the mica, which crystallizes in monoclinic prisms, has a pearly glaze on its cleavage surfaces, so that the inventive coating exhibits a metallic iridescent appearance. No special preparation, labor, equipment, or process technology is required to produce or apply the inventive coating, and the chemical and mechanical resistance of the coating is retained when the mica is added. The coating, however, must be baked or fired below the decomposition, melting, or dissolving temperature of the mica, for it not, the desirable heat transfer coefficient and luster of the mica will be greatly diminished or even lost.

In one refinement of the invention, the mica is modified with titanium dioxide, wherein the particle of mica are preferably coated with the titanium dioxide. In this way the melting, dissolving and/or decomposition temperature of the mica can be raised, thereby greatly broadening the area of possible application. Moreover, this refinement also improves the luster properties of the mica.

The coatings described can be manufactured in various ways. For example, mica may be distributed into the coating before the latter is baked or fired. This technique is used chiefly in complete or partial single-layer coatings, e.g., oven linings and cookware. Alternatively, the mica additive may be applied in pure form or in a vehicle to the surface of the unbaked or unfired coating by various methods, for example by spraying, dipping, powdering, or printing. The mica used may be in the form or in combination with a vehicle, as for example, water with support of suspending salts, or screen printing oils. And printing on the mica may also be done indirectly by other transfer techniques, e.g., via rubber transfer cylinder techniques.

With enameled objects in particular, the coating may be built up in multiple layers (e.g., ground, cover, and finishing enamels), whereby according to another advantageous feature of the invention each coating layer has mica additive. Under these conditions the mica may be added in different ways to the individual coating layers; e.g., it may be distributed in the base or ground coat enamel, i.e., "ground coat", before the baking or firing process, and thereafter applied to the covering enamel, i.e., "cover coat", via indirect transfer, and then sunk into this covering enamel by an additional firing. Especially with pots and pans, which have only a base enamel layer on the supporting or outer bottom surface where good heat transfer is desired, but both base enamel and covering enamel on their walls where it is desired to keep outward heat loss to a minimum, it can be advantageous for only the base enamel layer to have added mica, so that then the covering enamel layer acts as an insulator.

Finally, it is also possible for a pot or pan to be enameled all over with a base enamel, and with a covering enamel everywhere except on the supporting or outer bottom surface, so that neither of these layers contains added mica but the mica is applied to the supporting or outer bottom surface alone via a "shift-design" after the baking or firing of the enamel and then sunk into the base enamel by an additional firing. If desired, the inner bottom surface of the pot or pan may also be provided with added mica.

The term "silicate coating" in the foregoing should be understood to mean an inorganic silicate mixture of the main components quartz, flux, and optionally opacifiers.

I claim:

1. A heat resistant object having a coating on a surface thereof for improving the heat transfer properties of said surface, said coating consisting essentially of an inorganic silicate mixture containing at least 10% by weight of mica baked on said surface at a temperature below the decomposition, melting or dissolving temperature of said mica, wherein said mica is modified with titanium dioxide.

2. The coating in accordance with claim 1 wherein the mica is in particulate form and is coated with titanium dioxide.

3. The coating of claim 1 wherein said surface is a heat-engaging surface and said coating is disposed on said surface only.

4. The coating of claim 3 wherein said object is a cooking utensil, and said surface is the outer bottom surface.

5. A heat resistant object having a coating on a surface thereof for improving the heat transfer properties of said surface, said coating consisting essentially of an inorganic silicate mixture containing at least 10% by weight of mica baked on said surface at a temperature below the decomposition, melting or dissolving temperature of said mica, said mica being applied to the surface of said coating prior to any baking process.

6. The coating of claim 5 wherein said surface is a heat-engaging surface and said coating is disposed on said surface only.

7. The coating of claim 6 wherein said object is a cooking utensil, and said surface is the outer bottom surface.

8. The coating according to claim 5 wherein the mica is applied in pure form by spraying, dipping, powdering, or pressing.

9. The coating in accordance with claim 8 wherein the mica is applied in combination with a vehicle.

10. The coating according to any one of the claims 3, 4, 1, 5, 6, 7, 2, 8 or 9 wherein said coating comprises multiple layers, and all said layers include added mica.

* * * * *